United States Patent [19]

Tredway et al.

[11] 3,766,893

[45] Oct. 23, 1973

[54] ROTARY COMBUSTION ENGINE SPARK PLUG ARRANGEMENT

[75] Inventors: Ralph E. Tredway, Clarkston; David G. Kokochak, Royal Oak, both of Mich.

[73] Assignee: General Motors Corporation, Detroit, Mich.

[22] Filed: Aug. 9, 1972

[21] Appl. No.: 279,195

[52] U.S. Cl. .......... 123/8.45, 418/61

[51] Int. Cl. .......... F02b 55/14

[58] Field of Search .......... 123/8.45; 418/61

[56] References Cited

UNITED STATES PATENTS 1,970,004 8/1934 Friedell .......... 123/8.45

2,274,232 2/1942 Boyer .......... 123/8.45

3,464,395 9/1969 Kelly .......... 123/8.45

*Primary Examiner*—C. J. Husar

*Attorney*—J. L. Carpenter et al.

[57] ABSTRACT

A rotary combustion engine having a rotor that planetates within a housing in a rotor cavity defined by a pair of oppositely facing side walls and an interior peripheral wall and working chambers that are defined by these walls and the rotor and rotate with the rotor while varying in volume is provided with a spark plug whose electrode is open to a spark access hole through one of the side walls wherein as the rotor planetates the working chambers are operatively periodically connected to this access hole and are prevented by seals on the rotor from providing connection between any of the chambers.

4 Claims, 5 Drawing Figures

ROTARY COMBUSTION ENGINE SPARK PLUG ARRANGEMENT

This invention relates to rotary combustion engine spark plug arrangements and more particularly to rotary combustion engine spark plug arrangements for preventing gas blowby between chambers.

In the presently commercial rotary combustion engines of the Wankel type, one or more spark plugs are mounted in the engine's rotor housing with each spark plug having its electrode open to a spark access hole in the rotor housing's internal peripheral wall with the result that the engine rotor's apex seals traverse such a spark access hole. Since these apex seals normally have line contact with the rotor housing's internal peripheral wall, the spark access hole during apex seal transverse provides a leak path between the two chambers on the opposite sides of this apex seal with the result there is gas blowby resulting in power loss.

According to the present invention, a spark plug is mounted in one of the end housings of a rotary combustion engine with its electrode open to a spark access hole that extends through this end housing's interior side wall. The engine's working chambers which move with the motor within the housing while varying in volume are sequentially periodically opened by the rotor to the spark access hole which is prevented by seals on the rotor contacting with this one side wall from providing a leak path or connection between the chambers. In one embodiment, the spark access hole is located relative to the rotor's apex seals and is sized in relation to the corner seals so it is covered by a corner seal as this seal traverses the hole. In another embodiment the spark access hole is located relative to the rotor's corner seal and is sized in relation to the apex seals so that the hole is covered by an apex seal as this seal traverses the hole. In a third embodiment, each of the working chambers has a passage in the rotor having a port through one rotor side that registers with the spark access hole when this chamber has completed its compression phase. Thus, gas blowby is effectively prevented and furthermore, the spark plugs can be better located for more complete burn as they now need not avoid peripheral spark plug locations where the pressure differential and thus potential gas blowby between chambers is high.

An object of the present invention is to provide a new and improved rotary combustion enbine spark plug arrangement.

Another object is to provide in a rotary combustion engine a spark plug arrangement for preventing intake mixture blowby between the engine's working chambers.

Another object is to provide in a rotary combustion engine a spark access hole for a spark plug located in one of the engine housing's side walls so that the engine's working chambers are periodically opened by the rotor to the spark access hole and wherein the spark access hole is prevented by seals on the rotor from providing connection between the engine's working chambers.

Another object is to provide in a rotary combustion engine a spark access hole in one of the engine housing's side walls that is covered completely by the engine rotor's corner seals as they pass thereby.

Another object is to provide in a rotary combustion engine a spark access hole in one of the engine housing's side walls that is completely covered by the engine rotor's apex seals as they pass thereby.

Another object is to provide in a rotary combustion engine a spark access hole in one of the engine housing's side walls which periodically registers during rotor movement with working chamber ports in one of the engine rotor's sides.

These and other objects of the present invention will be more apparent from the following description and drawing in which.

Figure 1:
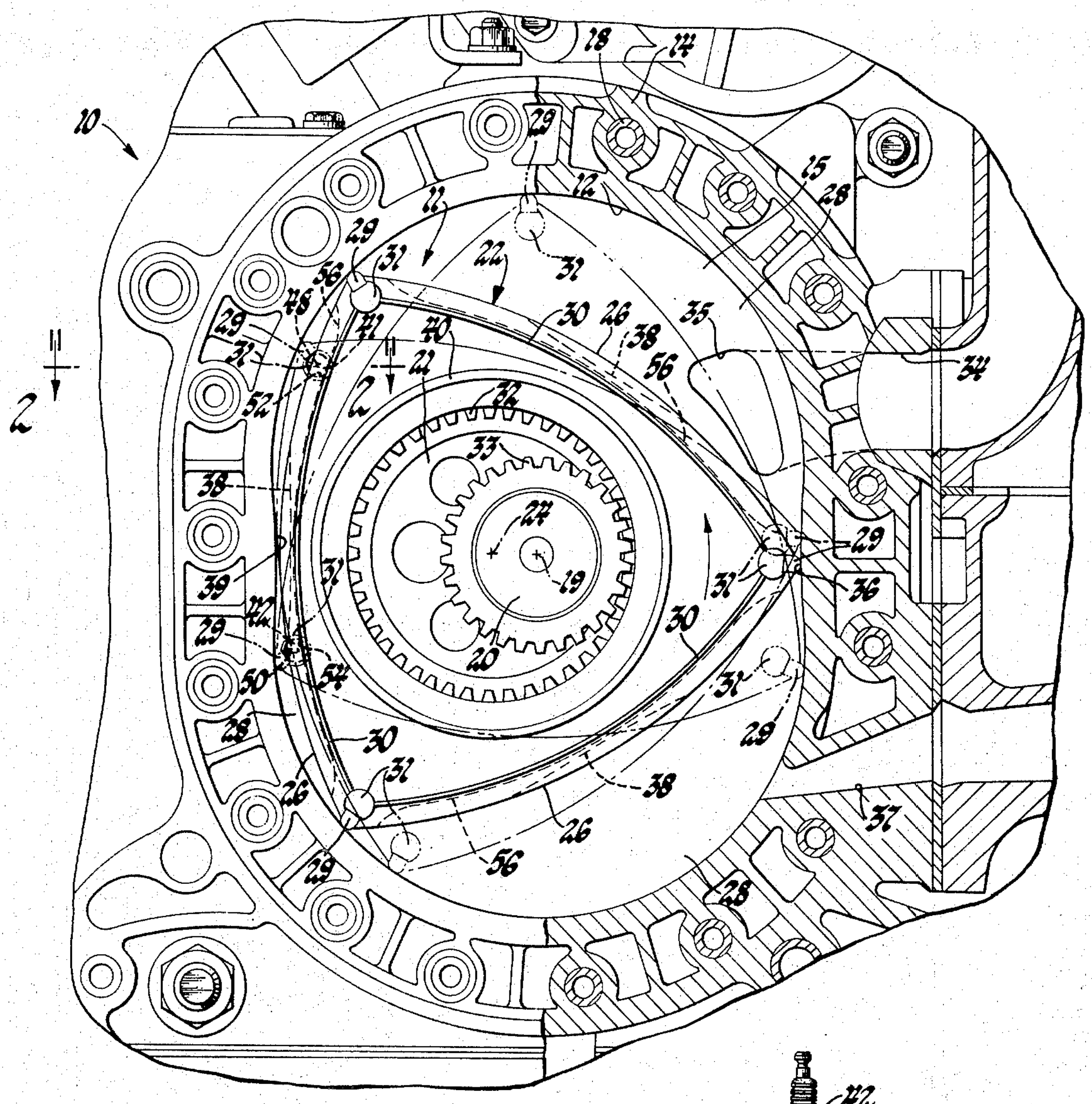
FIG. 1 is a transverse view with parts broken away of a rotary combustion engine having a spark plug arrangement according to one embodiment of the present invention.
Figure 2:
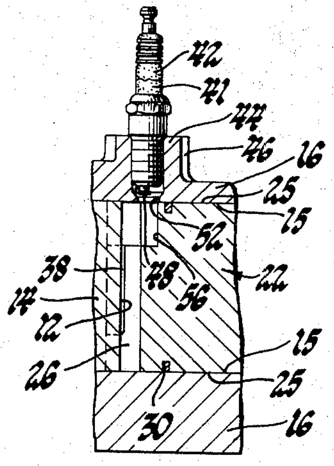
FIG. 2 is a view taken on line 2—2 in FIG. 1.

The spark plug arrangement according to the present invention is for use in a rotary combustion engine of the Wankel type which as shown in FIGS. 1 and 2 comprises a stationary outer body or housing 10. The housing 10 has a rotor cavity 11 that is provided by an inwardly facing peripheral wall 12 of a rotor housing 14 and oppositely facing spaced side walls 15 of two end housings 16, the rotor housing 14 being secured between the end housings 16 by bolts 18. Referring to FIG. 1, the peripheral wall 12 is in the shape of a two-lobed epitrochoid or a curve parallel thereto whose center is indicated at 19. A crankshaft 20 extends through the cavity 11 and is rotatably supported by the end housings 16 so that the shaft axis is coincident with a line through the center 19 parallel to the peripheral wall 12.

The crankshaft 20 is provided in the rotor cavity 11 with an eccentric 21 on which a rotor 22 is mounted for rotation about the eccentric's center line 24 which is thus the rotor's axis. The rotor 22 has the general shape of a triangle with two sides 25 which face the side walls 15 and three flanks or faces 26 which are convex and face the peripheral wall 12 and cooperate therewith and with the side walls 15 to define three variable volume working chambers 28. An apex seal 29 is mounted at each apex or corner of rotor 22 and extends the width thereof and three arcuate side seals 30 are mounted in grooves in each rotor side 25 and are arranged to extend adjacent the rotor faces between the apex seals 29 with three cylindrical corner seals 31 mounted in cylindrical blind bores in each rotor side 25 providing sealing links between the ends of the side seals and the apex seals, each of the corner seals 31 having a radially outwardly facing slot receiving one end of one of the apex seals 29.

The apex seals 29 are urged by biasing means, not shown, to continuously engage the peripheral wall 12 and both the side seals 30 and corner seals 31 are urged by biasing means, not shown, to continuously engage the side walls 15 with the complete seal arrangement acting to seal the working chambers 28. With the two-lobed peripheral wall 12 and the three-lobed rotor 22, each of the working chambers sequentially expands and contracts between minimum and maximum volume twice during each complete rotor revolution in fixed relation to the housing by forcing the rotor 22 to rotate at one-third the speed of the crankshaft 20. This is accomplished by gearing comprising an internally toothed gear 32 which is concentric with and fixed to the rotor 22. The gear 32 meshes with an externally toothed annular gear 33 which is freely received about and is concentric with the crankshaft and is made stationary by being fixed to the engine housing 10 at one of the end housings 16. The gear 32 has one and one-half times the number of teeth as the gear 33 to provide the required ratio of 3:1 between the crankshaft 20 and the rotor 22. An air-fuel mixture from a suitable carburetor arrangement, not shown, is made available to each working chamber 28 by an intake passage 34 that extends through the housing 10 and opens to the rotor cavity 11 through oppositely facing ports 35, only one being shown, in the side walls 15 with this porting to the rotor cavity being located to one side of the peripheral wall's cusp 36. The exhaust products of combustion are delivered from each chamber 28 by an exhaust passage 37 which extends through the housing 10 and opens to the rotor cavity 11 through the peripheral wall 12 on the other side of cusp 36. A single channel or recess 38 is provided in the center of each chamber face 26 of the rotor 22 to provide for the transfer to working gases past the peripheral wall's other cusp 39 when a rotor face is at or near a top-dead-center position as shown by the full-line rotor position in FIG. 1 so that a chamber is not divided by cusp 39 at the time when combustion is occurring therein. Circular oil seals 40 concentric with and mounted on the rotor on the rotor sides 25 radially inward of the side seals 30 and radially outward of the rotor gear 32 seal against the side walls 15 to retain oil radially inward of these oil seals.

The engine construction thus far described is conventional. Typically, such engines have each of the three working chambers undergoing intake, compression, expansion and exhaust to provide a power phase for each revolution of the crankshaft, there thus being provided from the three working chambers three power phases for every crankshaft revolution. As the rotor rotates in the direction of the arrow in FIG. 1, the working chambers 28 successively draw in the air-fuel mixture as the rotor sides 25 radially outward of the side seals 30 uncover the intake ports 35 in the side walls 15. The fuel mixture is then trapped in each working chamber and compressed and when the rotor face of this chamber is in the vicinity of top-dead-center, this mixture is ignited at the completion of the compression phase. It is present commercial practice to have either one or two spark plugs located in the rotor housing 14 with their spark access or shooter holes extending through the peripheral wall 12. In the case where only one spark plug is used, the single spark plug is normally located on the leading side of the cusp 39 which is generally opposite the exhaust opening to the rotor cavity and in the case of two spark plugs, they are located on the leading and trailing sides of cusp 39. In either case, the spark plug electrode is exposed to the passing working chambers 28 for ignition through a spark access hole in the peripheral wall 12. Upon ignition of the mixture in the working chambers, the peripheral wall 12 takes the reaction forcing the rotor 22 to continue rotation while the gas is expanding. The leading apex seal of each of the working chambers eventually transverses the exhaust passage 37 and the exhaust products are then expelled to the atmosphere to complete the cycle.

Describing now the embodiment of the spark plug arrangement according to the present invention shown in FIGS. 1 and 2, there are provided two spark plugs 41 and 42 which are threadedly mounted in spark plug bosses 44 and 46, respectively, in one of the end housings 16. The spark plugs 41 and 42 have their electrodes 48 and 50 located in spark access holes 52 and 54, respectively, which open to the rotor cavity 11 through this end housing's side wall 15. The spark plugs 41 and 42 and their respective spark access holes 52 and 54 are located on opposite sides of the peripheral wall's cusp 39 with the spark plug 42 and its spark access hole 54 leading the other spark plug 41 and its spark access hole 52. According to this embodiment of the invention, each of the spark access holes 52 and 54 is located radially outward of the path of the side seals 30 intermediate the rotor apexes and fully in the path of the corner seals 31 so that they are traversed by the corner seals 31 as the rotor 22 planetates. Furthermore, each of the spark access holes 52 and 54 has a smaller area than the end area of the corner seals 31 so that each spark access hole is completely covered during traversing corner seal motion as shown by the phantom-line rotor positions in FIG. 1 whereby there can be no blowby or communication between two chambers during the traversing of each spark access hole by the apex seal between these chambers. With a presently commercial rotor construction, the spark access holes 52 and 54 would normally be facing one side 25 of the rotor 22 at the time of firing so to provide for exposure of the spark plug electrodes to the working chambers, this rotor side has a relieved portion 56 that extends along each rotor face radially outward of the associated side seal 30 so that the spark access holes are completely uncovered to the working chambers when their respective rotor faces are in the vicinity of their top-dead-center positions. Thus, the working chambers 28 are sequentially periodically opened by the rotor 22 on the rotor side to the side wall located spark access holes 52 and 54 to allow the spark plugs 41 and 42 to ignite the intake mixture in the working chambers when they have completed their compression phases and these spark plug access holes 52 and 54 are covered by the corner seals 31 and are thus prevented from providing connection for gas blowby from one chamber to another chamber of lower pressure on the other side of the apex seal between these chambers.

Figure 3:
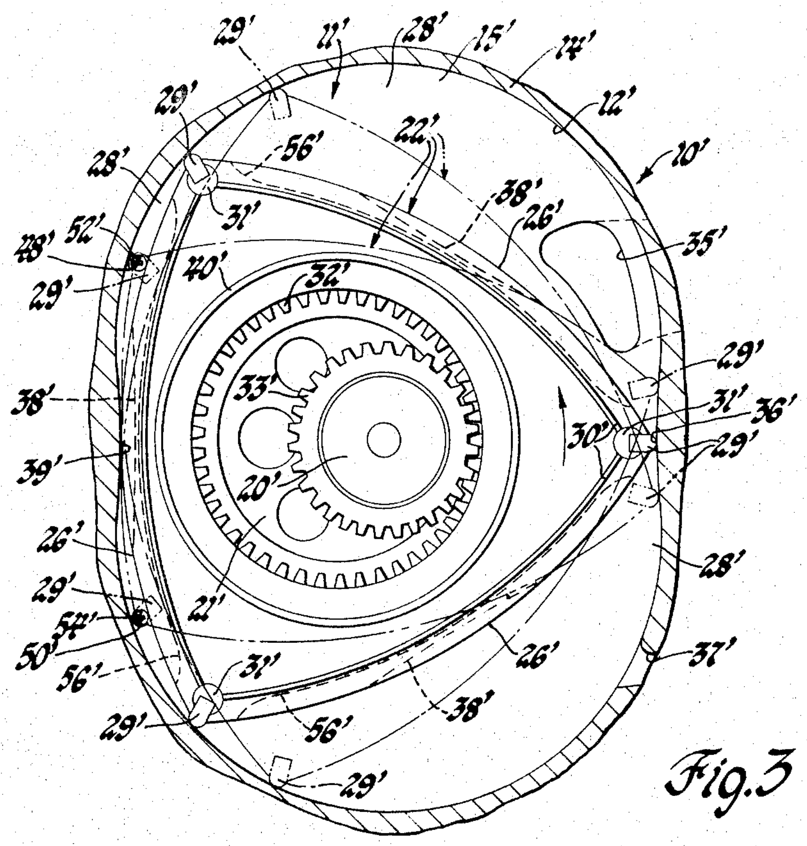
FIG. 3 is a view similar to FIG. 1 of a rotary combustion engine having a spark plug arrangement according to a second embodiment of the present invention.

Referring now to FIG. 3, there is shown another embodiment of the spark plug arrangement wherein the engine and the spark plug arrangement have like numerals but primed identifying corresponding parts shown in FIG. 1. In the FIG. 3 arrangement, the spark access holes 52' and 54' are located radially outward of where the spark access holes 52 and 54 are located in FIG. 1 embodiment closer to the peripheral wall 12' so that they are fully in the path of the apex seals 29' rather than the corner seals 31'. In addition, the area of the spark access holes 52' and 54' is made less than the end area of the apex seals 29' so that the spark access holes 52' and 54' are completely covered by the apex seals 29' as these seals pass thereover as shown by the phantom-line rotor positions. Thus in the FIG. 3 embodiment, the apex seals 29' completely cover spark access holes 52' and 54' to prevent gas mixture blowby between working chambers.

Figures 4, 5:
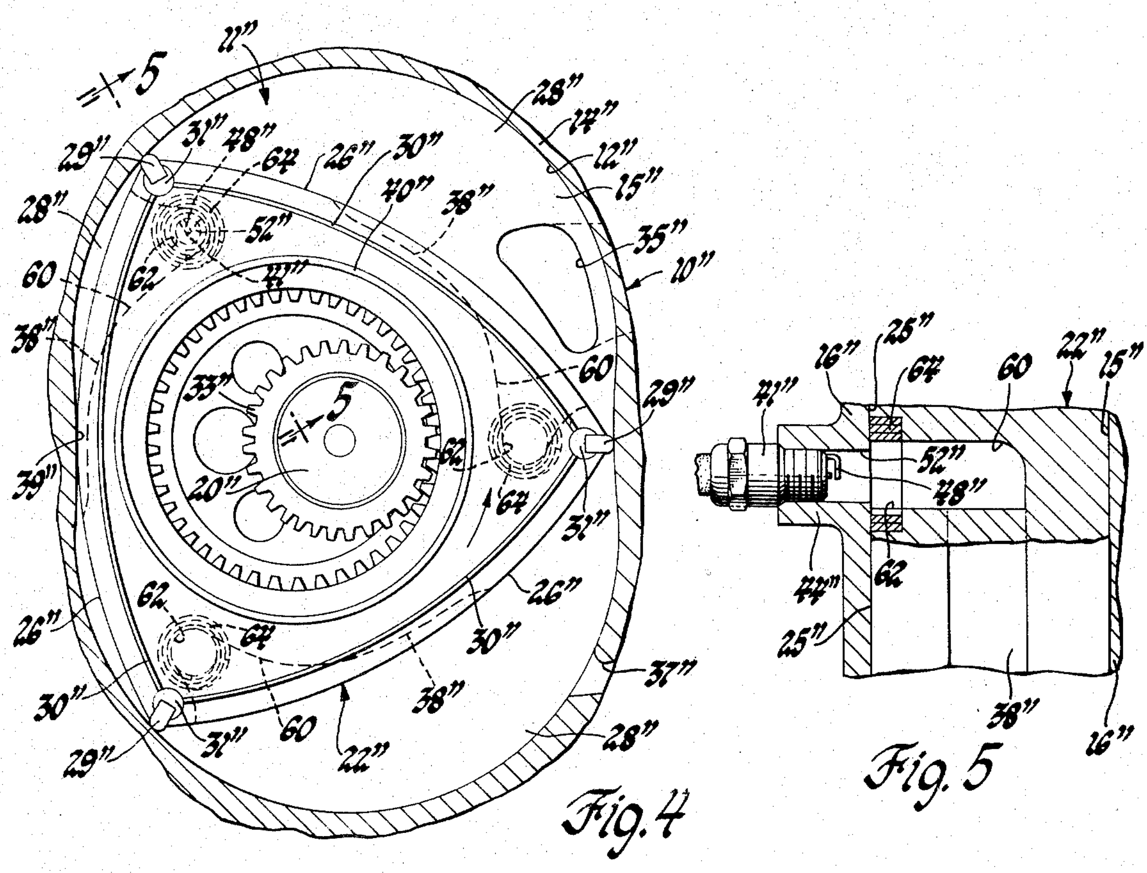
FIG. 4 is a view similar to FIG. 1 of a rotary combustion engine having a spark plug arrangement according to a third embodiment of the present invention.
FIG. 5 is a view taken along the line 5—5 in FIG. 4 showing a portion of the rotor in elevation.

In the third embodiment of the spark plug arrangement according to the present invention as shown in FIGS. 4 and 5, like numerals but double primed are used to identify corresponding parts in FIG. 1 and new numerals are used for added parts. In the FIG. 4 embodiment there is provided the single spark plug 41'' having its spark access hole 52'' located in the one side wall 15'' on the trailing side of the cusp 39'' radially inward of the location of the corresponding access hole 52 in the FIG. 1 embodiment and the access hole 52' in the FIG. 3 embodiment so that it is traversed by the side seals 30'' on one rotor side but by neither the corner seals 31'' nor the apex seals 29''. In this embodiment, the spark access hole 52'' is opened to the working chamber 28'' by three passages 60 in the rotor 22'' which each open at one end to one of the channels 38'' in the rotor faces 26'' and extends radially inward near the trailing rotor apex of the respective rotor face and then turns and extends axially through the rotor side 25'' facing the side wall 15'' and defines at this latter opening a port 62. The port 62 are located at the same radial location inward of the trailing corner seals 31'' of the respective chambers so that they sequentially periodically register with the spark access hole 52'' when the respective rotor faces 26'' are in the vicinity of their top-dead-center positions, one of which is shown in FIG. 4, to sequentially periodically expose the chambers 28'' to the spark plug electrode 48'' and when the spark access hole 52'' is not connected with one of the ports 62 it is covered by the opposing rotor side 25'' radially inward of the chambers' gas seals. A spring type seal 64 is mounted in the one rotor side 25'' about each of the ports 62 and sealingly contacts the opposite side wall 15'' so that when there is registry between the ports 62 and the spark access hole 52'' such connection is sealed to prevent gas escape from the then connected working chamber 28''. Thus, in the FIG. 3 embodiment, gas blowby is again prevented by way of a spark access hole being provided in the side wall instead of the peripheral wall.

Thus, in each of the embodiments, the working chambers are sequentially periodically opened by the rotor on one rotor side to a spark access hole in one of the housing side walls and this spark access hole is prevented from providing a path for gas blowby by sealing on the rotor contacting with this one side wall. In addition, it will be appreciated that while two of the embodiments have two spark plugs and attendant spark access holes, there may be only one spark plug and attendant spark access hole which is located and sized so as to be covered by either the corner seals or apex seals to prevent gas blowby. Furthermore, recognizing that the maximum pressure differential between two chambers and thus across the apex seal therebetween is experienced on the trailing side of the combustion side cusp of the peripheral wall, the subject spark plug arrangements which positively prevent gas blowby permit better locations of a trailing spark plug for more complete burn as compared with a spark plug arrangement wherein the spark access hole is located in a compromise position that avoids the high pressure differential zone where the gas blowby power loss would be higher than the gain in better burn.

The above described embodiments are illustrative of the invention which may be modified within the scope of the appended claims.

We claim:

1. A rotary combustion engine comprising a housing having an interior multi-lobed peripheral wall and a pair of oppositely facing interior side walls defining a rotor cavity, an output shaft rotatably mounted in said housing having an eccentric located in said rotor cavity, a multi-apex rotor rotatably mounted on said eccentric having sides opposite said side walls and a plurality of peripheral faces opposite said peripheral wall, said rotor faces and said housing walls cooperating to provide a plurality of working chambers that are spaced about and move with said rotor within said housing while varying in volume as said rotor planetates, gas seal means mounted on said rotor for sealingly contacting said housing walls to seal said working chambers from each other, intake passage means including an intake port in one of said housing walls located so that said working chambers are sequentially periodically opened by said rotor port past said gas seal means to said intake port as said rotor planetates, exhaust passage means including an exhaust port located in one of said housing walls so that said working chambers are sequentially periodically opened by said rotor past said gas seal means to said exhaust port as said rotor planetates, a spark access hole located in one of said side walls opposite one side of said rotor in a position so that as said rotor planetates said working chambers are sequentially operatively periodically opened by said rotor on said one rotor side to said spark access hole as said rotor planetates and said spark hole is prevented by said gas seal means from providing connection between said working chambers, and a spark plug mounted in said housing having an electrode exposed to said spark access hole.

2. A rotary combustion engine comprising a rotor housing having an interior multi-lobed peripheral wall and a pair of end housings having oppositely facing interior side walls defining a rotor cavity, an output shaft rotatably mounted in said end housings having an eccentric located in said rotor cavity, a multi-apex rotor rotatably mounted on said eccentric having sides opposite said side walls and a plurality of peripheral faces opposite said peripheral wall, said rotor faces and said housing walls cooperating to provide a plurality of working chambers that are spaced about and move with said rotor within said rotor housing while varying in volume as said rotor planetates, gas seal means mounted on said rotor for sealingly contacting said housing walls to seal said working chambers from each other, said gas seal means including an apex seal mounted on each rotor apex connecting said peripheral wall and side seals mounted on each rotor side contacting the opposite side wall with each said side seal extending adjacent one of said rotor faces between two of said rotor apexes and corner seals mounted on each rotor side contacting the opposite side wall with each said corner seal sealingly joining one of said apex seals and two of said side seals, intake passage means including an intake port in one of said housing walls located so that said working chambers are sequentially periodically opened by said rotor port past said gas seal means to said intake port as said rotor planetates, exhaust passage means including an exhaust port located in one of said housing walls so that said working chambers are sequentially periodically opened by said rotor past said gas seal means to said exhaust port as said rotor planetates, a spark access hole sized to be coverable by said corner seals located in one of said side walls opposite one side of said rotor in a position so that as said rotor planetates said working chambers are sequentially periodically opened by said rotor on said one rotor side to said spark access hole and said corner seals sequentially periodically cover said spark access hole to prevent connection between said chambers as said apex seals pass said spark access hole, and a spark plug mounted in the end housing with said one side wall having an electrode exposed to said spark access hole.

3. A rotary combustion engine comprising a rotor housing having an interior multi-lobed peripheral wall and a pair of end housings having oppositely facing interior side walls defining a rotor cavity, an output shaft rotatably mounted in said housing having an eccentric located in said rotor cavity, a multi-apex rotor rotatably mounted on said eccentric having sides opposite said side walls and a plurality of peripheral faces opposite said peripheral wall, said rotor faces and housing walls cooperating to provide a plurality of working chambers that are spaced about and move with said rotor within said rotor housing while varying in volume as said rotor planetates, gas seal means mounted on said rotor for sealingly contacting said housing walls to seal said working chambers from each other, said gas seal means including an apex seal mounted on each rotor apex contacting said peripheral wall and side seals mounted on each rotor side contacting the opposite side wall with each said side seal extending adjacent one of said rotor faces between two of said rotor apexes and corner seals mounted on each rotor side contacting the opposite side wall with each said corner seal sealingly joining one of said apex seals and two of said side seals, intake passage means including an intake port in one of said housing walls located so that said working chambers are sequentially periodically opened by said rotor port past said gas seal means to said intake port as said rotor planetates, exhaust passage means including an exhaust port located in one of said housing walls so that said working chambers are sequentially periodically opened by said rotor past said gas seal means to said exhaust port as said rotor planetates, a spark access hole sized to be coverable by said apex seals located in one of said side walls opposite one side of said rotor in a position so that as said rotor planetates said working chambers are sequentially periodically opened by said rotor on said one rotor side to said spark access hole and said apex seals sequentially periodically cover said spark access hole to prevent connection between said chambers as said apex seals pass said spark access hole, and a spark plug mounted in the end housing with said one side wall having an electrode exposed to said spark access hole.

4. A rotary combustion engine comprising a rotor housing having an interior multi-lobed peripheral wall and a pair of end housings having oppositely facing interior side walls defining a rotor cavity, an output shaft rotatably mounted in said housing having an eccentric located in said rotor cavity, a multi-apex rotor rotatably mounted on said eccentric having sides opposite said side walls and a plurality of peripheral faces opposite said peripheral wall, said rotor faces and said housing walls cooperating to provide a plurality of working chambers that are spaced about and move with said rotor within said rotor housing while varying in volume as said rotor planetates, gas seal means mounted on said rotor for sealingly contacting said housing walls to seal said working chambers from each other, said gas seal means including an apex seal mounted on each rotor apex contacting said peripheral wall and side seals mounted on each rotor side contracting the opposite side wall with each said side seal extending adjacent one of said rotor faces between two of said rotor apexes and corner seals mounted on each rotor side contacting the opposite side wall with each said corner seal sealingly joining one of said apex seals and two of said side seals, intake passage means including an intake port in one of said housing walls located so that said working chambers are sequentially periodically opened by said rotor port past said gas seal means to said intake port as said rotor planetates, exhaust passage means including an exhaust port located in one of said housing walls so that said working chambers are sequentially periodically opened by said rotor past said gas seal means to said exhaust port as said rotor planetates, each of said working chambers having a separate passage in said rotor having a port in one side of said rotor located radially inward of said corner seals and said side reals on said one rotor side, said gas seal means further including port seals mounted in said one rotor side contacting the opposite side wall with each said port seal extending about one of said ports, a spark access hole located in the side wall opposite said one rotor side in a position so that as said rotor planetates said ports in said rotor are sequentially periodically opened to said spark access hole and said one rotor side radially inward of said corner seals and said side seals periodically covers said spark access hole to prevent connection between said working chambers, and a spark plug mounted in the end housing with said one side wall having an electrode exposed to said spark access hole.

* * * * *

PO-1050
(5/69)

UNITED STATES PATENT OFFICE
CERTIFICATE OF CORRECTION

Patent No. 3,766,893 Dated October 23, 1973

Inventor(s) Ralph R. Tredway, David G. Kokochak

It is certified that error appears in the above-identified patent and that said Letters Patent are hereby corrected as shown below:

On the Title and Abstract page, legend [75], the inventor's middle initial "E." should be -- R. --.
Column 1, line 47, "enbine" should be -- engine --.
Column 3, line 26, "to", second occurrence, should be -- of --.
Column 8, line 34, delete "each of said working chambers having"; line 35, after "rotor" insert -- connected to each of said working chambers, each of said passages --; line 37, "reals" should be -- seals --.

Signed and sealed this 2nd day of April 1974.

(SEAL)
Attest:

EDWARD M.FLETCHER,JR.
Attesting Officer

C. MARSHALL DANN
Commissioner of Patents